United States Patent Office 3,172,909
Patented Mar. 9, 1965

3,172,909
OXIDATION OF ACROLEIN AND METHACROLEIN TO THE CORRESPONDING ACIDS IN THE PRESENCE OF A CATALYST CONTAINING PHOSPHORUS, BORON, MOLYBDENUM AND OXYGEN
James Louis Callahan, Bedford, Ernest C. Milberger, Maple Heights, and Richard E. Utter, Cleveland, Ohio, assignors to The Standard Oil Company, Cleveland, Ohio, a corporation of Ohio
No Drawing. Filed Mar. 19, 1962, Ser. No. 180,833
6 Claims. (Cl. 260—530)

This invention relates to the catalytic oxidation of unsaturated aldehydes and to an improved catalyst for such a process. The invention is particularly useful in the conversion of unsaturated aldehydes such as acrolein and methacrolein to the corresponding unsaturated acids namely; acrylic and methacrylic acids.

It is already known that unsaturated aldehydes such as acrolein and methacrolein may be converted to their corresponding unsaturated acids by vapor phase catalytic oxidation processes. Viewed in its broadest terms, the process of the present invention is generally similar to such prior art processes, but it is readily distinguished therefrom by the nature of the catalyst which is employed in the present invention.

Briefly stated, the process of this invention is carried out by reacting an unsaturated aldehyde with oxygen in the vapor phase and in the presence of a catalyst. The catalyst of the present invention is a heteropoly acid consisting essentially of the elements boron, phosphorous, molybdenum, oxygen, and in some instances, hydrogen.

The process of this invention is applicable to the oxidation of a variety of unsaturated aldehydes which may be aliphatic, alicyclic or aromatic substituted aldehydes. The aldehyde may also be substituted by hydroxy, ether, carboxylic acid, carboxylic acid ester, keto, nitro and like groups or halogen atoms. Acrolein, crotonaldehyde, methacrolein, alpha-ethylacrolein, beta-methyl crotonaldehyde, alpha - beta - dimethyl crotonaldehyde, alpha-gamma-dimethyl crotonaldehyde, beta-ethyl crotonaldehyde, 2-hexenal, alpha-isobutylacrolein, alpha-amylacrolein, alpha- or beta-cyclohexylacrolein, beta phenethylacrolein, tetrolaldehyde cinnamaldehyde, propargylic aldehyde and the like are representative of the alpha-beta unsaturated aldehydes to which the process of this invention can be applied with special advantage.

The new process is equally successful however in oxidizing aldehydes having a double bond further removed from the aldehyde group. Typical examples of such aldehydes are vinyl acetaldehyde, 3- or 4-pentenal, methylvinyl acetaldehyde, isopropenyl acetaldehyde, and 2-phenyl-4-hexenal.

Mixtures of aldehydes can be oxidized by means of this process, and the feed to the process may also be a mixture in which the major component is an unsaturated aldehyde but may contain other compounds such as saturated aldehydes, saturated and unsaturated hydrocarbons, and other materials.

As mentioned above the catalyst of this invention is a heteropoly acid consisting essentially of the elements of boron, phosphorous, molybdenum, oxygen and preferably also hydrogen which are combined according to the following general formula:

$$P_a B_b Mo_4 O_c (H_2O)_d$$

where $a$ may be in the range of 3 to 571
$b$ may be in the range of 2.5 to 571
$c$ may be in the range of 23 to 2296
$d$ may be in the range of 0 to 250.

In its freshly made state, the catalyst will usually contain water. However, the water is not present as water of crystallization but it is chemically combined with the catalyst so as to provide a hydroxylated surface.

One method of preparing such a catalyst involves the formulation of a solution containing molybdenum trioxide, phosphoric acid and boric acid followed by the heating of this solution to form the heteropoly acid. It will be noted that the phosphorous, boron and molybdenum are present in their highest oxidation states. Alternatively, a borophosphoric acid may be impregnated with a phosphomolybdic acid. The method of preparation is in no way critical and any convenient method may be employed so long as the final composition meets the formula given above. By the same token, the final form of the catalyst is unimportant and it may be manufactured in the form of pellets or in the form of finely divided particles by conventional techniques such as spray drying, extrusion or tableting. Also the catalyst may be employed in conjunction with catalytically inert supports such as silicon carbide or like materials.

The oxygen for the process of this invention may be supplied either in the form of an oxygen-containing gas such as air or as free molecular oxygen. In most circumstances air is the preferred source of oxygen from the standpoint of cost and because the nitrogen in the air serves as a purge gas in the reactor. The amount of oxygen fed to the reactor based on one mole of the unsaturated aldehyde should be in the range of 0.25 to 50 moles. The best results in the process are obtained when the mole ratio of oxygen to unsaturated aldehyde is greater than 0.25:1 and less than about 2:1.

If desired, water may be added along with the feed to the process since it appears to exert a beneficial influence on the reaction. When water is added to the feed, a mole ratio of water to the unsaturated aldehyde of about 6:1 appears to give the best results, but larger ratios even above about 12:1 may also be employed.

The temperature at which the reaction is conducted may be in the range of 500 to 1000° F. but the best results are obtained when the temperature is in the range of about 600 to 800° F. One of the surprising aspects of this invention is that excellent results both as to conversion and yield are obtained near the lower end of the preferred range of temperatures, i.e. at about 650° F. With the prior art catalysts, the results obtained at the comparatively low temperatures are not as good as the results obtained at the same temperature with the catalyst of the present invention.

The pressure at which the reactor is operated is not an important variable in the process, and while higher pressures are operable, entirely satisfactory results are obtained at or near atmospheric pressure.

Another relatively important process variable is the apparent contact time which is defined as the apparent volume of catalyst in the reactor divided by the volume of material fed the reactor per unit of time. The volume of material fed to the reactor is measured at the reactor conditions. In general, the contact time may be in the range of 0.1 to 50 seconds, and contact times in the range of 1 to 20 seconds seem to give the best results.

The process of this invention may be conducted intermittently or continuously. In general, a so-called fixed bed reactor employing a pelleted form of catalyst is preferred. The reaction is exothermic but the temperature variation within the catalyst bed may be controlled with facility in such a reactor. However, it is also feasible to employ the catalyst in finely divided form in a so-called fluidized catalyst system.

The catalyst employed in this process is not materially affected by the reaction and it is usually unnecessary to regenerate the catalyst even after long periods of operation. However, catalyst regeneration such as by contacting the catalyst with an oxygen-containing gas an an elevated temperature is contemplated within the scope of this invention, if necessary.

The effluent from the process of this invention may contain carbon monoxide, carbon dioxide, saturated acids and the unconverted unsaturated aldehyde as well as the desired unsaturated acid. The unsaturated acid may be recovered from the effluent by conventional methods such as condensation, scrubbing with water or other suitable solvent or compression followed by subsequent expansion of the reactor effluent gases. If scrubbing is employed, it may be advantageous to employ a hot scrubbing solution since the unreacted aldehydes generally boil at lower temperatures than the acids. Hence, if the temperature of the scrubbing solution is properly regulated, the unreacted aldehyde will not be adsorbed and it may be recycled directly to the reactor. If difficulties are encountered due to polymerization during the recovery operation, a small amount of a polymerization inhibitor such as hydroquinone or the methyl ether of hydroquinone may be added directly to such operations.

In order to illustrate the present invention more fully, a catalyst was prepared in the following manner.

350.72 g. of $H_3BO_3$ was dissolved in 1 l. of distilled water and then 653.9 g. of 85% $H_3PO_4$ was gradually added to this solution. The resulting solution was dried at 302° F. and then calcined at 800° F. for about 12 hours. 375 g. of this material was then added to an aqueous solution containing 125 g. of phosphomolybdic acid ($20MoO_3 \cdot 2H_3PO_4 \cdot 48H_2O$) and 184.6 g. of water. This slurry was dried at 284° F. The product had the formula $P_{17.59}B_{17.26}Mo_4O_{81.88}(H_2O)_{1/2}$. The resulting hard blue catalyst was ground to a fine powder and mixed with 2.8% by weight of graphite. This mixture was then introduced into a tableting machine where it was transformed into ¼" pellets. The pellets were subsequently calcined at 800° F. for a period of about 12 hours. As the final step in the catalyst preparation, the catalyst was subjected to treatment with a mixture containing about 10 parts by volume of acrolein, 50 parts by volume of air, and 60 parts by volume of water at a temperature of about 800° F. for a period of approximately 25 hours.

The resulting catalyst was employed in a series of runs on acrolein which were all conducted at atmospheric pressure. The results of these runs are reported in the following table. In this table the following definitions are employed:

Percent conversion = 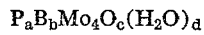 × 100

Percent yield of useful produc = 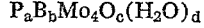 × 100

For purposes of the above definition, only acrylic and acetic acids were considered to be useful products. The table now follows:

Table I

| Run | Reactor Conditions | | Feed Composition (parts by volume) | | | Percent Conversion | | Percent Yield, Useful Products |
|---|---|---|---|---|---|---|---|---|
| | Contact Time | Temp., °F. | Acrolein | Air | $H_2O$ | Acrylic Acid | Acetic Acid | |
| 1 | 5.5 | 600 | 10 | 51 | 60 | 23.6 | 2.0 | 84.7 |
| 2 | 5.5 | 650 | 10 | 51 | 60 | 25.7 | 2.5 | 82.2 |
| 3 | 3 | 650 | 10 | 430 | 60 | 27.8 | 1.8 | 98.0 |
| 4 | 3 | 650 | 10 | 430 | 60 | 25.1 | 1.1 | 97.0 |
| 5 | 5.5 | 675 | 10 | 51 | 60 | 41.4 | 4.2 | 84.4 |
| 6 | 3 | 675 | 10 | 80 | 60 | 28.2 | 1.3 | 87.0 |
| 7 | 3.5 | 675 | 10 | 91 | 30 | 32.1 | 2.1 | 91.4 |
| 8 | 5.5 | 700 | 10 | 51 | 60 | 47.3 | 6.0 | 76.0 |
| 9 | 3 | 725 | 10 | 410 | 60 | 42.4 | 2.8 | 88.7 |
| 10 | 3 | 725 | 10 | 74 | 60 | 43.8 | 3.3 | 85.0 |
| 11 | 5.5 | 800 | 10 | 51 | 60 | 43.7 | 9.3 | 59.4 |

From the foregoing, it will be readily deduced that the conversion of acrolein to acrylic acid and acetic acid is increased with an increase in reactor temperature, while the yield of useful products is decreased. The data for Runs 3 and 4 are particularly surprising in view of the high yields obtained. Although the conversion level in the latter runs was only about 25%, this is not too important since the unreacted acrolein may be recovered and recycled to the reactor and, furthermore, considerable benefits are derived from operation of the reactor at the low temperature (650° F.).

Many modifications of the present invention may be made without departing from the spirit or scope of this invention, and this application for Letters Patent is intended to cover all such modifications as would reasonably fall within the scope of the appended claims.

We claim:

1. A process which comprises the step of reacting in the vapor phase at a temperature in the range of 500 to 1000° F. an unsaturated aldehyde selected from the group consisting of acrolein and methacrolein with oxygen in the presence of a catalyst which is represented by the following emperical formula:

$$P_a B_b Mo_4 O_c (H_2O)_d$$

wherein P, B and Mo are present in their highest oxidation states and $a$ is in the range of 3 to 571
$b$ is in the range of 2.5 to 571
$c$ is in the range of 23 to 2296 depending on the unsatisfied valences of P, B and Mo
$d$ is in the range of 0 to 250 and recovering the corresponding unsaturated acid product.

2. The process of claim 1 wherein water is added to the reactants.

3. A process for the manufacture of acrylic acid which comprises contacting a catalyst which is represented by the following emperical formula:

$$P_a B_b Mo_4 O_c (H_2O)_d$$

wherein P, B and Mo are present in their highest oxidation states and $a$ is in the range of 3 to 571
$b$ is in the range of 2.5 to 571
$c$ is in the range of 23 to 2296 depending on the unsatisfied valences of P, B and Mo
$d$ is in the range of 0 to 250 with a mixture of acrolein and oxygen at a temperature in the range of 500 to 1000° F. and recovering the acrylic acid.

4. The process of claim 3 wherein water is added to said mixture of acrolein and oxygen.

5. The process of claim 3 wherein the temperature is in the range of 600 to 800° F.

6. A process for the manufacture of methacrylic acid which comprises contacting a catalyst which is represented by the following emperical formula:

$$P_a B_b Mo_4 O_c (H_2O)_d$$

wherein P, B and Mo are present in their highest oxidation states and $a$ is in the range of 3 to 571
$b$ is in the range of 2.5 to 571
$c$ is in the range of 23 to 2296 depending on the unsatisfied valences of P, B and Mo
$d$ is in the range of 0 to 250 with a mixture of methacrolein and oxygen at a temperature in the range of 500 to 1000° F.

References Cited in the file of this patent
UNITED STATES PATENTS

| | | |
|---|---|---|
| 2,212,900 | Groll et al. | Aug. 24, 1940 |
| 2,744,928 | Smith et al. | May 8, 1956 |
| 2,881,212 | Idol et al. | Apr. 7, 1959 |
| 2,938,001 | Rosset | May 24, 1960 |
| 2,993,010 | Guyer et al. | July 18, 1961 |
| 3,029,288 | Etherington | Apr. 10, 1962 |
| 3,087,964 | Koch | Apr. 30, 1963 |